(12) United States Patent
Winston

(10) Patent No.: US 6,205,998 B1
(45) Date of Patent: Mar. 27, 2001

(54) SOLAR CONCENTRATOR GAP AND RECEIVER DESIGN

(75) Inventor: Roland Winston, Chicago, IL (US)

(73) Assignee: Solar Enterprises International, LLC, Chicago, IL (US)

( * ) Notice: Subject to any disclaimer, the term of this patent is extended or adjusted under 35 U.S.C. 154(b) by 0 days.

(21) Appl. No.: 09/596,569

(22) Filed: Jun. 19, 2000

(51) Int. Cl.[7] .................................................. F24J 2/10
(52) U.S. Cl. ........................ 126/692; 126/694; 359/869
(58) Field of Search ................................. 126/683–690, 126/693, 691, 692, 657; 359/868, 869, 853, 726, 727, 867, 852

(56) References Cited

U.S. PATENT DOCUMENTS

| 4,230,095 | * | 10/1980 | Winston | 126/657 |
| 4,359,265 | * | 11/1982 | Winston | 126/693 |
| 4,387,961 | * | 6/1983 | Winston | 126/690 |
| 4,419,984 | * | 12/1983 | McIntire | 126/657 |

* cited by examiner

*Primary Examiner*—James C. Yeung
(74) *Attorney, Agent, or Firm*—Michael D. Rechtin; Foley & Lardner

(57) ABSTRACT

A gap between absorber and reflector of a solar concentrator. A gap is required in a solar concentrator for thermal isolation reasons and the position of the receiver relative to reflector and a notch are optimized for best solar collection efficiency.

5 Claims, 1 Drawing Sheet

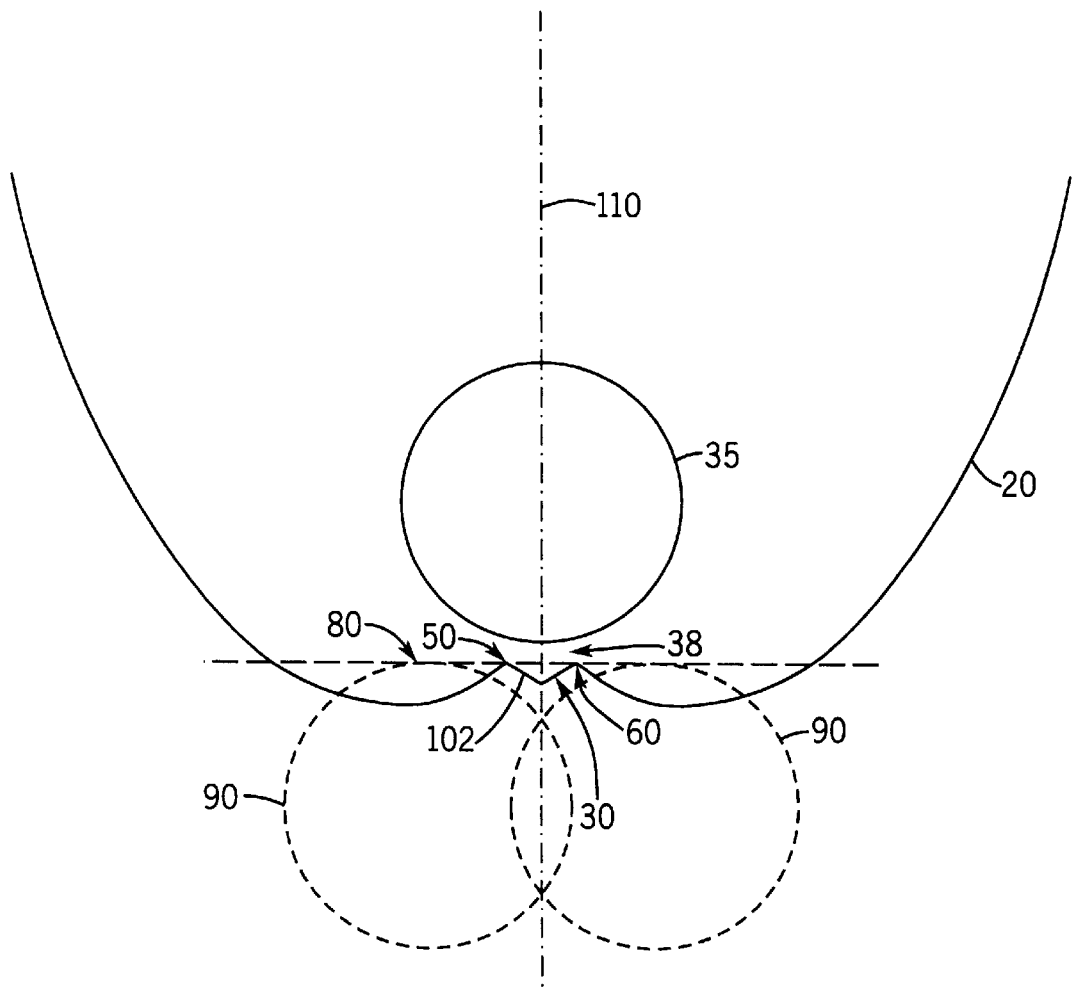
FIGURE

SOLAR CONCENTRATOR GAP AND RECEIVER DESIGN

The present invention is directed generally to a solar concentrator having a gap between a primary reflector and a solar receiver. In particular the invention is directed to a solar concentrator having an optimized positioning of a receiver (collector) relative to a primary reflector and a nearby groove or cavity in the profile of the primary reflector.

The need to design a new generation of nonimaging solar concentrators has seen renewed interest in the so-called "gap problem"—that is, how to design near ideal concentrators in which the reflector must accommodate a space or gap around the absorber for thermal isolation or mechanical reasons. This has always been of very great practical significance. The subject dates back almost 20 years, and some of the early developments have substantial disadvantages.

Prior art nonimaging solar concentrator designs have typically required the reflector and absorber to touch. The reason for this is compelling and worth recounting. These designs forced the input and output etendue to match by the judicious use of reflectors. The argument is as follows: The etendue can be expressed in terms of optical path lengths along maximum angle rays (the "edge rays") both at the input to and at the output of the concentrator. The output rays are, in turn, incident on the absorber. This relationship is very general and makes use of the Hilbert Integral, a concept borrowed from the calculus of variations and adapted to optics. The etendue matching requirement is satisfied by making sure the optical paths lengths of the extreme edge rays, which are at the ends of the input and output, are the same. This is accomplished by mirror segments at both input and output which bisect the angles between the extreme edge rays. One extreme ray is reflected into the other, causing it to retrace the same optical path. In this way the equality of optical paths is enforced by making the paths identical. This methodology requires mirror segments contiguous with input and output and in particular touching the absorber. However, practical considerations dictated a gap between absorber and reflector. The outlook as a result of the Hilbert Integral theorem was that interposing a gap would result in loss of optical throughput, loss of concentration or both.

For solar thermal concentrators a physical space or "gap" was needed between the hot absorber and the reflector to insulate the absorber, with a vacuum space or with air, or simply to prevent damage to the reflector. This practical need for a gap led to various attempts at modifying the design with the aim of reducing or eliminating potential loss of radiation through the gap while maintaining close to maximum concentration. An important step was taken in developing a loss-less W-shaped cavity with gap (g) up to $(g+r) \approx 2r$, where r is the radius of the cylindrical absorber. This provides proof of the existence of a loss-less solution, but of course, one gives up light concentration. Then, a microstructure was found that redirects all radiation outside the angular substance of the absorber into the absorber. This progressed to the case of g=r where the exterior etendue just matches the etendue subtended by the receiver. This limiting case is straightforward: for g=r the angle subtended by the absorber at the cavity wall is 60°. The etendue subtended by the absorber is (up to constant factors) 2 sin 30° while the exterior etendue is (up to constant factors) 2 (1−sin 30°). These are equal. Of course, one still gives up some concentration because the requirements that all radiation outside the angular substance of the absorber is certainly sufficient, but is more than necessary. Some portions of the exterior etendue are empty because light rays from the sky will not reach it. Nevertheless, this solution is practical because all the elements of the microstructure are identical. The structures are V-shaped and are designed by the conventional method of images. In the large-gap limit g=r, and the micro-grooves have 120° opening angle. Practical implementations usually needed are only a single V which works perfectly up to $g \approx 0.27r$ and quite well for even larger gaps. However, the requirement of zero optical loss is unduly restrictive since it results in significant loss of concentration. Various design approaches optionally permit maintaining maximal concentration while accepting optical losses, eliminating optical losses at the expense of concentration or some compromise between these two extremes. It is even possible to design to a virtual absorber which is larger than the physical absorber, thereby producing even more than ideal concentration. Of course this is at the expense of loss of optical throughput as radiation escapes through the gap. This became known as the "ice cream cone" design from it's suggestive shape. What is needed is an approach to optimize the trade-off between optical loss and concentration. This trade-off should also consider economic and manufacturability issues.

It is therefore an object of the invention to provide an improved solar concentrator design.

It is another object of the invention to provide a novel solar concentrator gap design.

It is another object of the invention to provide an improved solar concentrator having a particular spatial relationship between a primary reflector, coupled V-notch portion and a solar receiver.

It is a further object of the invention to provide a novel solar concentrator having a receiver's real space position defined by forming a mirror image based on a tangent to a virtual receiver's surface, the tangent line defined by connecting two points (in a two dimensional construct) to establish the end of the primary reflector and the beginning of the V-notch.

It is an additional object of the invention to provide an improved solar concentrator having a receiver's position defined by a mirror image of a virtual receiver across one edge (or plane in three dimensions) of a V-notch and a tangent to the vertical receiver.

Other objects and advantages of the invention will become apparent from the description herein and drawings described.

BRIEF DESCRIPTION OF THE DRAWING

The FIGURE illustrates in a two dimensional cross section the positioning of a virtual receiver relative to an actual solar receiver.

A solar concentrator with a gap constructed in accordance with the invention is shown generally in the FIGURE and is indicated generally at 10. The solar concentrator 10 is shown only as a two dimension cross-section, but is understood to be extended transversely to a three dimensional unit for actual use. The solar concentrator 10 includes a primary reflector 20, which in a most preferred embodiment, comprises a tailored surface contour to optimize light collection efficiency. For example, see U.S. Pat. No. 5,586,013, which is incorporated by reference herein as directed to the tailored reflector for achieving a desired purpose.

Coupled to the primary reflector 20 is a V-notch 30 having a characteristic surface contour preferably tailored as described hereinbefore. In addition the V-notch 30 itself can also be tailored to optimize its efficiency in processing light to the benefit of the solar concentrator 10.

As described hereinbefore, it is useful to position carefully the location of a light receiver 35 relative to a gap 38 in order to further optimize efficiency of operation. In particular, in the two dimensional cross-section of the FIGURE, the position of the light receiver 35 is established by forming a tangent line 40 defined by points 50 and 60 which occur as the discontinuity between surface curvatures of the primary reflector 20 and the V-notch 30. In three dimensions a plane is formed between two lines which are established by the surface contour discontinuities between the primary reflector 20 and the V-notch 30. For purposes of explanation we will proceed with the two dimensional construct of the FIGURE understanding this is extended to the three dimensional system for commercial use.

In the two dimensional geometry example of the FIGURE, one establishes a tangent point 80 on virtual image 90 of the light receiver 35. The resulting virtual image 90 is reflected across the surface contour of either plane 100 or 102 of the V-notch 30. Consequently, the receiver 35 is also equally disposed along the mirror image line 110 (equal areas left and right of the line 110). The resulting configuration of the receiver 35, the primary reflector 20 and the V-notch 30 cooperate to optimize efficiency while maintaining the necessary gap in the solar concentrator 10.

Further advantages and features of the invention will be appreciated by reference to the claims set forth hereinafter. While preferred embodiments have been described, it will be clear to those of ordinary skill in the art that changes and modifications can be made without departing from the spirit and scope of the invention in its fullest aspects.

What is claimed is:

1. A solar concentrator, comprising:
    a primary reflector having a surface contour;
    a V-notch portion coupled to said primary reflector with a first line and a second line established between said primary reflector surface contour and said V-notch portion; and
    a receiver disposed at a mirror image position across a plane defining said V-notch portion relative to a virtual receiver image having a tangent thereto, the tangent defined by a plane having included the first line and the second line.

2. The solar concentrator as defined in claim 1 wherein the virtual receiver image includes one image either side of said V-notch portion.

3. The solar concentrator as defined in claim 2 wherein said receiver is disposed symmetrically relative to said V-notch portion.

4. The solar concentrator as defined in claim 1 wherein said primary reflector comprises a tailored non-imaging surface contour.

5. The solar concentrator as defined in claim 1 wherein said V-notch portion comprises a tailored non-imaging surface contour.

* * * * *